United States Patent
Sawdon et al.

(10) Patent No.: US 8,055,864 B2
(45) Date of Patent: Nov. 8, 2011

(54) EFFICIENT HIERARCHICAL STORAGE MANAGEMENT OF A FILE SYSTEM WITH SNAPSHOTS

(75) Inventors: Wayne A. Sawdon, San Jose, CA (US); Frank B. Schmuck, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 711 days.

(21) Appl. No.: 11/834,338

(22) Filed: Aug. 6, 2007

(65) Prior Publication Data

US 2009/0043978 A1 Feb. 12, 2009

(51) Int. Cl.
*G06F 12/00* (2006.01)
(52) U.S. Cl. ......................................... 711/162; 711/101
(58) Field of Classification Search .................. 711/101, 711/162
See application file for complete search history.

(56) References Cited

U.S. PATENT DOCUMENTS

| | | | |
|---|---|---|---|
| 6,792,518 B2 * | 9/2004 | Armangau et al. | 711/162 |
| 7,092,976 B2 * | 8/2006 | Curran et al. | 1/1 |
| 7,467,282 B2 * | 12/2008 | Rao et al. | 711/202 |
| 2005/0065986 A1 * | 3/2005 | Bixby et al. | 707/204 |
| 2006/0212481 A1 | 9/2006 | Stacey et al. | |
| 2007/0266056 A1 * | 11/2007 | Stacey et al. | 707/203 |
| 2009/0043978 A1 * | 2/2009 | Sawdon et al. | 711/162 |

FOREIGN PATENT DOCUMENTS

WO 2007075587 A2 7/2007

OTHER PUBLICATIONS

PCT Search Report PCT/EP2008/059545 mailed Nov. 6, 2008.
Marcos K. Aguilera et al.; "Improving recoverability in multi-tier storage systems:" 37th Annual IEEE/FIP International Conference on Dependable Systems and Networks (DSN'07); 2007.

* cited by examiner

*Primary Examiner* — Reba I Elmore
(74) *Attorney, Agent, or Firm* — Cantor Colburn LLP; Justin Dillon

(57) ABSTRACT

A method is provided for managing the storage of a file that has been selected for migration from a first storage level within a file system to a second storage level. The method comprises copying each of one or more data blocks of the selected file that are stored in the first storage level at a physical disk address maintained in a corresponding reference of an inode for the selected file from the first storage level to the second storage level; maintaining a logical ditto address in each reference of an inode for each snapshot file in the file system that refers to one of the one or more data blocks of the selected file that were copied to the second storage level; and updating the file system to include a managed region for controlling access to the one or more data blocks through the inode for the selected file.

18 Claims, 14 Drawing Sheets

EFFICIENT HIERARCHICAL STORAGE MANAGEMENT OF A FILE SYSTEM WITH SNAPSHOTS

TRADEMARKS

IBM® is a registered trademark of International Business Machines Corporation, Armonk, N.Y., U.S.A. Other names used herein may be registered trademarks, trademarks, or product names of International Business Machines Corporation or other companies.

BACKGROUND OF THE INVENTION

1. Field of the Invention

Exemplary embodiments of the present invention relate to data storage systems, and, more specifically, to data storage systems that store snapshots indicating the status of stored data at particular points in time.

2. Description of Background

Many data storage systems organize stored data according to a file metaphor. In these storage systems, related data are stored in a file, and the data storage system stores multiple files. The data storage system then stores references to the multiple files to enable access to the data in those files. A single file may be stored in contiguous or disparate locations in the data storage device. Storage of data in disparate locations in a data storage device often results when a large data file is to be stored on a device that already stores many files and the large data file must be broken up into data blocks to fit in the free areas within the storage device. Data are also often stored in disparate locations when additional data is added to an existing file. The assembly of stored data into structured files on a data storage device is referred to as a file system.

Data storage systems often store point-in-time copies or images of the data of all files that are currently stored in the file system. These images are referred to as snapshots (or clones or flash-copies). The content of a snapshot is the data that is stored within the active file system at the time the snapshot was captured. Data storage systems can use snapshots to store the state of the file system on a secondary storage system such as another disk drive or magnetic tape storage system. Data storage systems can also use file system snapshots to enable recreation of data that has been deleted (that is, to access previous versions of files that have been deleted or updated).

To minimize the time to create a snapshot as well as the storage space for maintaining the snapshot, some methods for taking snapshots of a file system defer the actual copying of the data in the original file system to the snapshot until the data in the original system is modified (for example, overwritten or deleted). Because the data is not copied to the snapshot data until a write is performed on the original data, systems employing methods of this type are referred to as "copy-on-write" systems. Copy-on-write techniques are often used to implement file versioning, which provides for the concurrent existence of several versions of files in a file system by maintaining snapshots of individual files rather than the whole system.

Copy-on-write systems can utilize metadata, which are control structures created by the file system software to describe the structure of a file and the use of the disks that contain the file system, so that non-modified data blocks of a modified file need not be copied to the snapshot. These systems create snapshot metadata sets that include file references that describe the locations of the original data file in the original file system so that the non-modified data-blocks can be referenced from metadata within both the original file and the snapshot copy of the file. This creates multiple references to the same data block in the original file system: the reference in the metadata of the original file system and the references in each of the snapshot data sets.

The existence of multiple references to a single data block within the original file system impacts the requirements of the original file system. File systems that utilize snapshots that each store a reference to an original data block must maintain an indication or mapping of each reference to that data block in order to determine if the data block is in-use or free. Without multiple references, a single bit may be sufficient to indicate if a data block is in-use or free. With the multiple references, however, multiple bits may be required to track the multiple references and ensure that no references exist to the data block prior to declaring the data block "free."

Because higher-speed storage devices (such as hard disk drive arrays) are more expensive (per byte stored) than slower devices (such as optical discs and magnetic tape drives), some larger file systems employ a Hierarchical Storage Manager (HSM) to automatically move data between high-cost and low-cost storage media. In a file system using an HSM (such as, for example, IBM's ADSTAR Distributed Storage Manager, Tivoli's Storage Manager Extended Edition, or Legato's NetWorker), most of the file system data is stored on slower offline devices and copied to faster online disk drives as needed. An HSM monitors the use of data in a file system, identifies which files in a file system have not been accessed for long periods of time, and migrates all or some of their data to slower storage devices. This frees space in the faster online storage, thereby allowing additional files and more data to be stored. In effect, an HSM provides an economical solution to storage large amounts of data by turning faster disk drives into caches for the slower mass storage devices.

In a typical HSM scenario, data files that are frequently used are stored on hard disk drives, while data files that are not used for a certain period of time are migrated to magnetic tape drives. When a user attempts to access a data file that has been migrated to tape, the file is automatically and transparently restored to online hard disk drives, allowing the operation to complete as if the data had never been migrated. The advantage is that while the total amount of stored data can be much larger than the capacity of the disk storage available, because only rarely-used files are on tape, users will typically not notice any slowdown.

The inventors herein have recognized that, in file systems that utilize snapshots, the need to track multiple references to a single data block can significantly complicate the operation of the file system, particularly if the file system also employs an HSM. For instance, when an HSM migrates a file to tape, it expects to be able to reclaim the disk space occupied by the file's data blocks. In the presence of snapshots, however, these data blocks may still be referenced by snapshots from older versions of the file and, therefore, cannot be freed until all other versions of the file have been migrated to tape as well. Moreover, while the HSM can reclaim all disk space occupied by the file once all versions of a file have been migrated, data blocks that had been stored singularly and shared by snapshots of different file versions will be stored redundantly as separate copies on tape. That is, snapshots that can occupy very little space on disk will occupy just as much space as the entire file system on tape. Additionally, when the HSM returns the migrated file to online storage, new data blocks will be allocated for the returned data and the other online references to the original blocks cannot be located. As a result, restoring a migrated file may result in unnecessary copying of the data as well as require more online storage than files which have never been migrated.

Accordingly, the inventors herein have recognized a need to provide for efficient hierarchical storage management within a file system that utilizes snapshots.

SUMMARY OF THE INVENTION

The shortcomings of the prior art can be overcome and additional advantages can be provided through exemplary embodiments of the present invention that are related to a method for managing the storage of a file that has been selected for migration from a first storage level within a file system to a second storage level. The selected file is selected from a plurality of source files that are each organized within the file system into one or more data blocks. The file system has an inode for each source file of the plurality of source files. Each inode has a reference to each of the one or more data blocks of the corresponding source file. The file system is configured to regularly generate snapshot files of the source files of the plurality of source files. The file system has an inode for each snapshot file. The inode for each snapshot file having a reference to each of the one or more data blocks of the corresponding source file at the time the snapshot file was generated. The method comprises copying each of the one or more data blocks of the selected file that are stored in the first storage level at a physical disk address maintained in the corresponding reference of the inode for the selected file from the first storage level to the second storage level. The method further comprises maintaining a logical ditto address in each reference of the inode for each snapshot file in the file system that refers to one of the one or more data blocks of the selected file that were copied to the second storage level. Each logical ditto address indicates that additional processing is required to obtain the physical disk address of the data block referred to by the reference. The method further comprises updating the file system to include a managed region for controlling access to the one or more data blocks through the inode for the selected file.

The shortcomings of the prior art can also be overcome and additional advantages can also be provided through exemplary embodiments of the present invention that are related to computer program products and data processing systems corresponding to the above-summarized method are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that can be implemented at minor cost to provide efficient hierarchical storage management for file systems that store snapshots indicating the status of stored data at particular points in time by creating logical block pointers in online storage to refer to data being migrated offline that is shared by multiple snapshot versions of a file, and by replacing logical block pointers that refer to offline data that is shared by multiple snapshot versions of a file with physical disk pointers when the shared data is restored to online storage.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
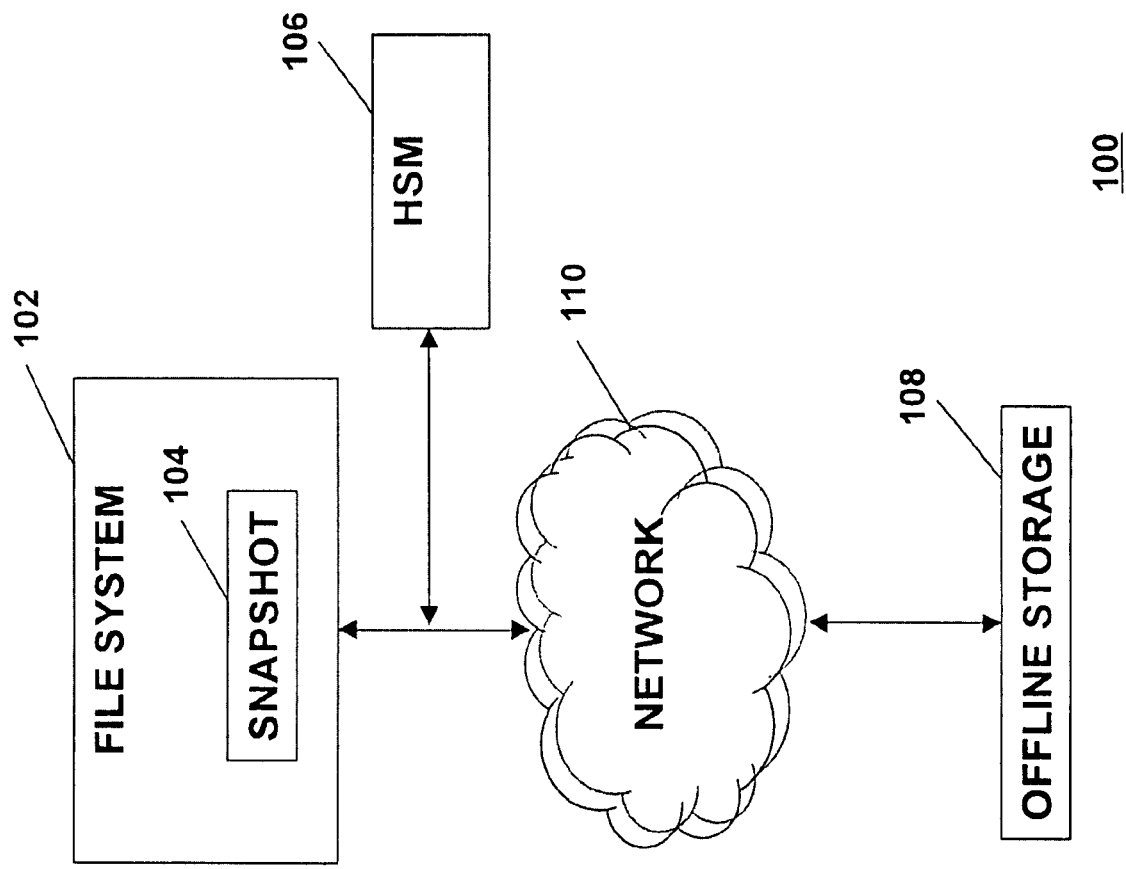
FIG. 1 is a block diagram illustrating an exemplary embodiment of a general system architecture for a file system providing hierarchical system management.

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

DETAILED DESCRIPTION OF THE INVENTION

The following disclosure describes exemplary embodiments of techniques and mechanisms for providing efficient hierarchical storage management for file systems that maintain snapshots indicating the status of stored data at particular points in time. The following is intended to provide a detailed description of exemplary embodiments of the present invention and should not be taken as being limiting of the invention itself. Rather, any number of other embodiments may fall within the scope of the invention, which is defined in the claims that follow this description of exemplary embodiments.

Exemplary embodiments of the present invention may be implemented on or in conjunction with computer systems that store data on mass storage devices. The features of the mass storage systems described herein should not be taken as limiting the invention, and it should be noted that exemplary embodiments can be implemented on or in conjunction with data storage devices that have different features or structures than the examples provided herein. One example of a file system upon which exemplary embodiments of the present invention may be implemented is IBM's General Parallel File System (GPFS). GPFS is similar to file systems conforming to the Xopen file system standard, and, accordingly, all such file systems are suitable for use with exemplary embodiments the present invention. The present invention, however, should not be taken as being limited to use with such file systems. Exemplary embodiments can be implemented on or in conjunction with various types of other file systems including various types of disk file systems, network file systems, and special purpose file systems.

Exemplary embodiments of the present invention described herein can be configured to operate in conjunction with file systems that implement files and directories based upon the following metadata structures:

File system: A software component that manages a defined set of disks (or other media) and provides access to data in ways to facilitate consistent addition, modification and deletion of data and data files. The term is also used to describe the set of data and metadata contained within a specific set of disks (or other media). File systems are usable with any data storage medium that is capable of being accessed by name with data located in nonadjacent blocks; accordingly, where the terms "disk", "disk storage", "storage", or the like are employed herein, this more general characterization of the storage medium is intended.

Data/File System Data: Arbitrary strings of bits which have meaning in the context of a specific application.

File: A named string of bits which can be accessed by a computer application. A file has certain standard attributes such as length, a modification time, and a time of last access.

Data Blocks: Areas of file system memory that contain user data that is to be later retrieved and used by users or other applications. In exemplary file systems, the data for a file can be stored in one or more separate data blocks that are referenced by disk address pointers stored in the file's inode.

Snapshot: A file or set of files that capture the state of the file system at a given point in time.

Metadata: Control structures created by file system software to describe the structure of a file and the use of the disks that contain the file system. Specific types of metadata which apply to exemplary file systems are more particularly characterized below and include directories, modes, inodes, allocation maps, and logs.

Directories: Control structures which associate a name with a set of data represented by an inode. Exemplary file systems can utilize directory entries that are stored in data blocks in a manner similar to the storage of other file data, and utilize metadata structures for files that store directory information that are similar to those used by other data files (inode plus indirect blocks containing disk addresses of directory blocks). Directories are able to contain a large number of directory entries. Directories can contain entries that refer to other directories in order to create a hierarchical directory structure, and a directory that is referred to by an entry in another directory is referred to as a subdirectory. The present invention is not limited by the details of the format and other metadata for directories in exemplary file systems as described herein, and alternative exemplary file systems can utilize other directory and metadata storage structures.

Inode: A metadata structure that contains the file attributes (for example, owner, access permissions, modified time, file size) of the file plus a series of pointers to areas of disk (or other storage media) which contain the data which make up the file. An inode may be supplemented by indirect blocks which supplement the inode with additional pointers, say, if the file is large. In exemplary file systems described herein, associated collections of inodes are referred to as "inode files", and inode files are stored as regular files (inode plus indirect blocks). Other exemplary file systems can use different representations of the collection of the data in the inodes and inode files. In exemplary file systems described herein, the collection of some or all of the information contained within the inode is referred to as "node information."

Allocation maps: Control structures that file systems may employ to indicate whether specific areas of the disk (or other control structures such as inodes) are in use or are available. This allows software to effectively assign available blocks and inodes to new files.

Superblock: A metadata element that contains global file system configuration data. In particular, it contains information used for locating inodes and allocation maps.

Logs: A set of records used to keep the other types of metadata in synchronization (that is, in consistent states) to guard against loss in failure situations. Logs contain single records that describe related updates to multiple structures.

Referring now to FIG. 1, an exemplary overall system architecture 100 in which exemplary embodiments of the present invention may operate is illustrated in FIG. 1. System architecture includes a snapshot file system 102 that is used to store one or more data files. These file systems capture and maintain one or more snapshot datasets 104. These snapshot datasets 104 may be used by file system 102 for a large variety of purposes such as, for example, to efficiently communicate and store backup datasets upon remote backup systems, to recover accidentally deleted files, and to retrieve data that has been overwritten either accidentally or intentionally.

File system 102 includes a computer program that allows other application programs to store and retrieve data on storage devices such as disk drives, non-volatile memory, or other data storage devices. A file in file system 102 is a named data object of arbitrary size. File system 102 provides interfaces that allow application programs to create files, give names to files, store or write data into files, read data from files, delete files, and perform other operations on files.

A file structure defines the organization of data in file system 102 on the storage devices. Individual files may be divided into multiple data blocks of a fixed size for allocation on the storage devices. The block size, which can be expressed in bytes or bits, can be set to according to the actual application environment and available types and size of storage, and a single allocated block may contain an entire file or a part of an individual file.

In addition to the file data itself, file system 102 can contain a directory that maps file names to the data files, file metadata that contains information about the file, including the location of the file data on the storage device (that is, which device blocks hold the file data), an allocation map that records which device blocks are currently in use to store metadata and file data, and a superblock that contains overall information about the file structure (for example, the locations of the directory, allocation map, and other metadata structures).

Each file in file system 102 is represented by an inode that describes the attributes of the file and contains addressing structures that serve as a starting point for finding the file's data in storage. The directory maps file names to the inodes allocated for the files (for example, using inode numbers identifying the files where they reside in the file system) and forms the organizational hierarchy for the files.

Exemplary embodiments of the present invention can be implemented to provide support efficient hierarchical system management of data contained on snapshot file systems such as, for example, file system 102 of FIG. 1. As shown, a computer or processing unit upon which file system 102 exists in system architecture 100 communicates with an offline storage system 108 via a network 110 and a hierarchical system manager (HSM) 106. Offline storage unit 108 is a storage device that is not located on or under the control of the processing unit for file system 102. Examples of offline storage devices include floppy disks, optical disks, and magnetic tape. HSM 106 is used in conjunction with offline storage system 108 to automatically move the data blocks of files within file system 102 between online storage devices that are by the same processing as file system 102 and offline storage devices.

Network 110, which connects file system 102 with offline storage 108, can be, for example, a circuit switched network, such as the Public Service Telephone Network (PSTN). Network 110 can be, for example, a packet switched network. The packet switched network can be, for example, a wide area network (WAN), such as the global Internet, a private WAN, a local area network (LAN), a telecommunications network, or any combination of the above-mentioned networks. In an alternative example, network 110 can be, for example, a wired, wireless, broadcast, or point-to-point network. As another example, file system 102 executes on the same computer system as the computer system of offline storage 108.

The computer systems of file system 102 and offline storage 108 can, for example, be one or more PCs (for example, IBM or compatible PC workstations running a version of the Microsoft Windows operating system, Macintosh computers running a version of the Mac OS operating system, or equivalents), Personal Digital Assistants (PDAs), game consoles, or any other computer processing devices. Alternatively, the computer systems of file system 102 and offline storage 108 can be a server (for example, one or more computers executing a version of a SunOS, AIX, or Linux operating system).

Figure 2A:
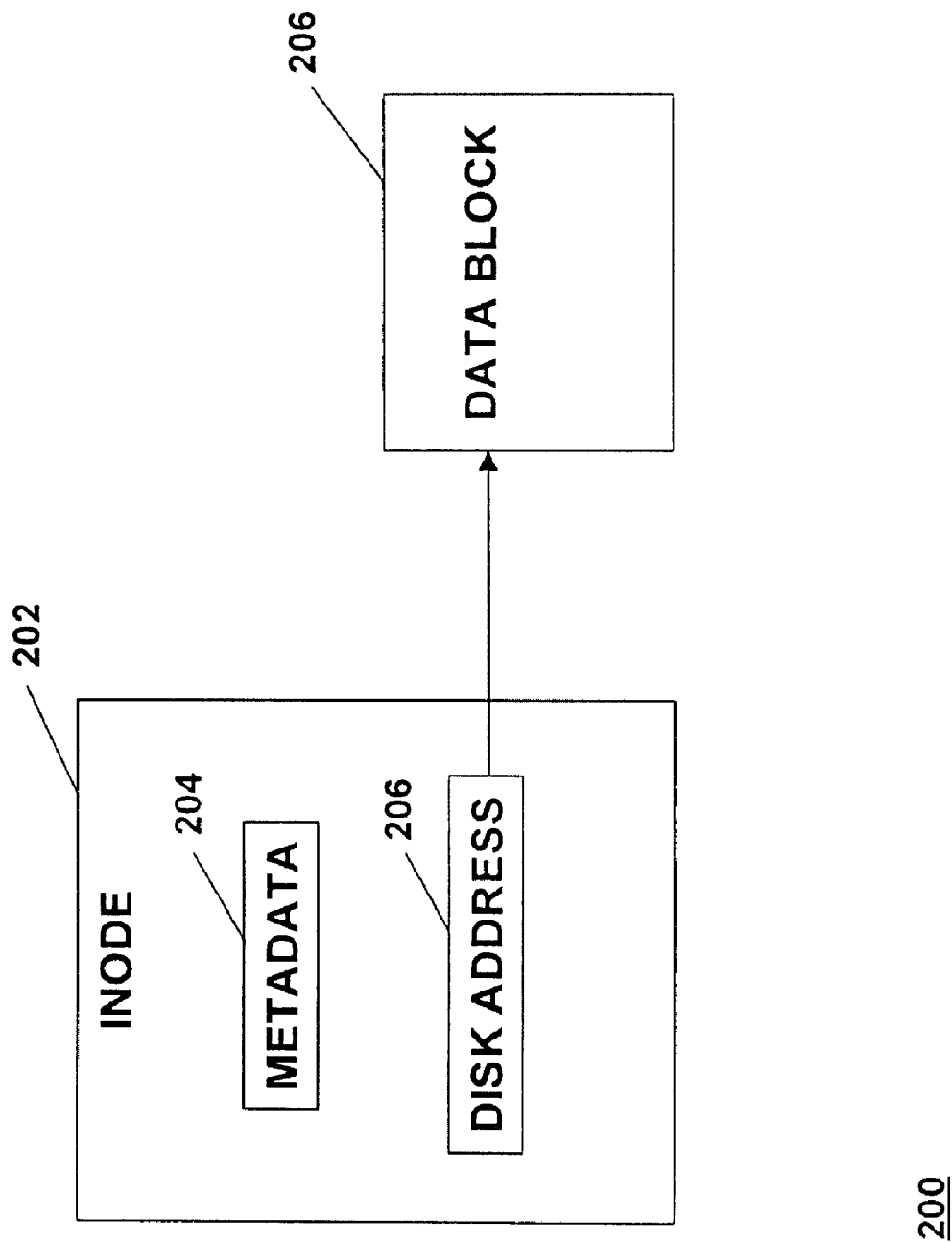
FIG. 2A is a block diagram illustrating an exemplary embodiment of a file system data structure set having an inode and related data block.

An exemplary data structure set 200 that is associated with data stored within exemplary file systems is illustrated in FIG. 2A. Data structure set 200 includes an inode 202 that is assigned to a file and contains metadata 204 for that file. Metadata 204 can include, for example, the file's creation time, size, access permissions, pointers to data blocks, and other associated data. Inode 202 is uniquely identified by an inode number, and data within the inode is used by the file system to locate the associated file. Inode 202 further contains a disk address 206 that is a pointer to a data block 208 of the file. Disk address 206 specifies an identification of the specific disk drive as well as a sector or block within that disk drive that contains data block 208.

Inode 202 can be stored in the file system sequentially within an inode file of fixed size inodes that are not visible to the user. An inode in the inode file having a particular inode number can be accessed according to an offset amount into the inode file; the offset amount is determined by multiplying the inode number by the length of each inode and then reading the data structure in the inode file that is offset by that calculated value.

Figure 2B:
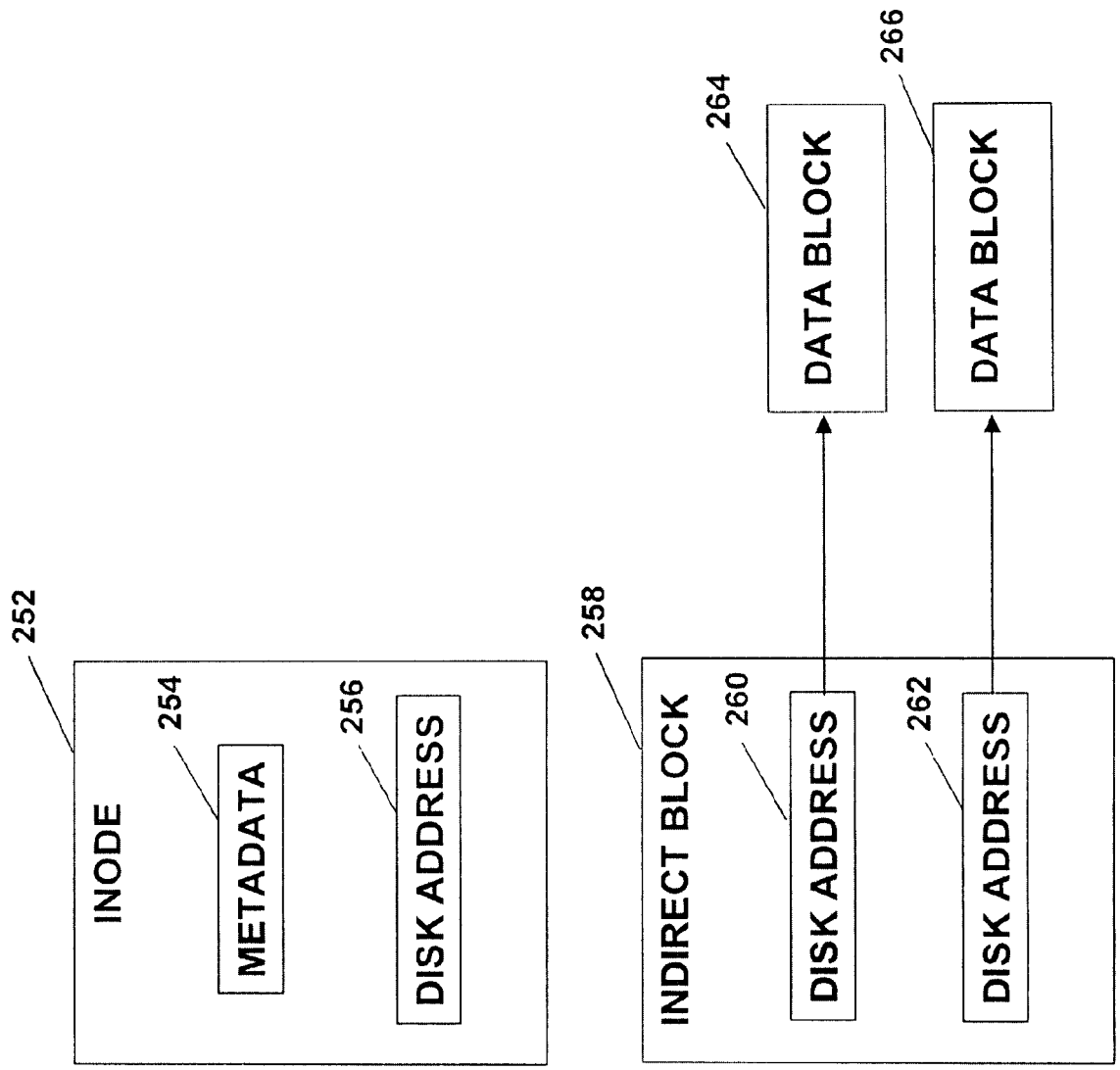
FIG. 2B is a block diagram illustrating an exemplary embodiment of a file system data structure set having an inode and related indirect blocks and data blocks.

FIG. 2B illustrates a second exemplary data structure set 250 that describes data stored within exemplary file systems. While data structure set 200 is adequate for use with small files in which disk address 206 can be stored within the inode itself, data structure set 250 can be used with larger files. In data structure set 250, a disk address 256 of an inode 252 points to one or more indirect data blocks 258 that each contain one or more pointers that point to either actual data blocks or to other indirect blocks that contain further disk addressing information. In FIG. 2, indirect data block 258 contains a first direct disk address 260 and a second direct disk address 262 that respectively point to a first data block 264 and a second data block 266 of the file associated with inode 252.

Figure 3:
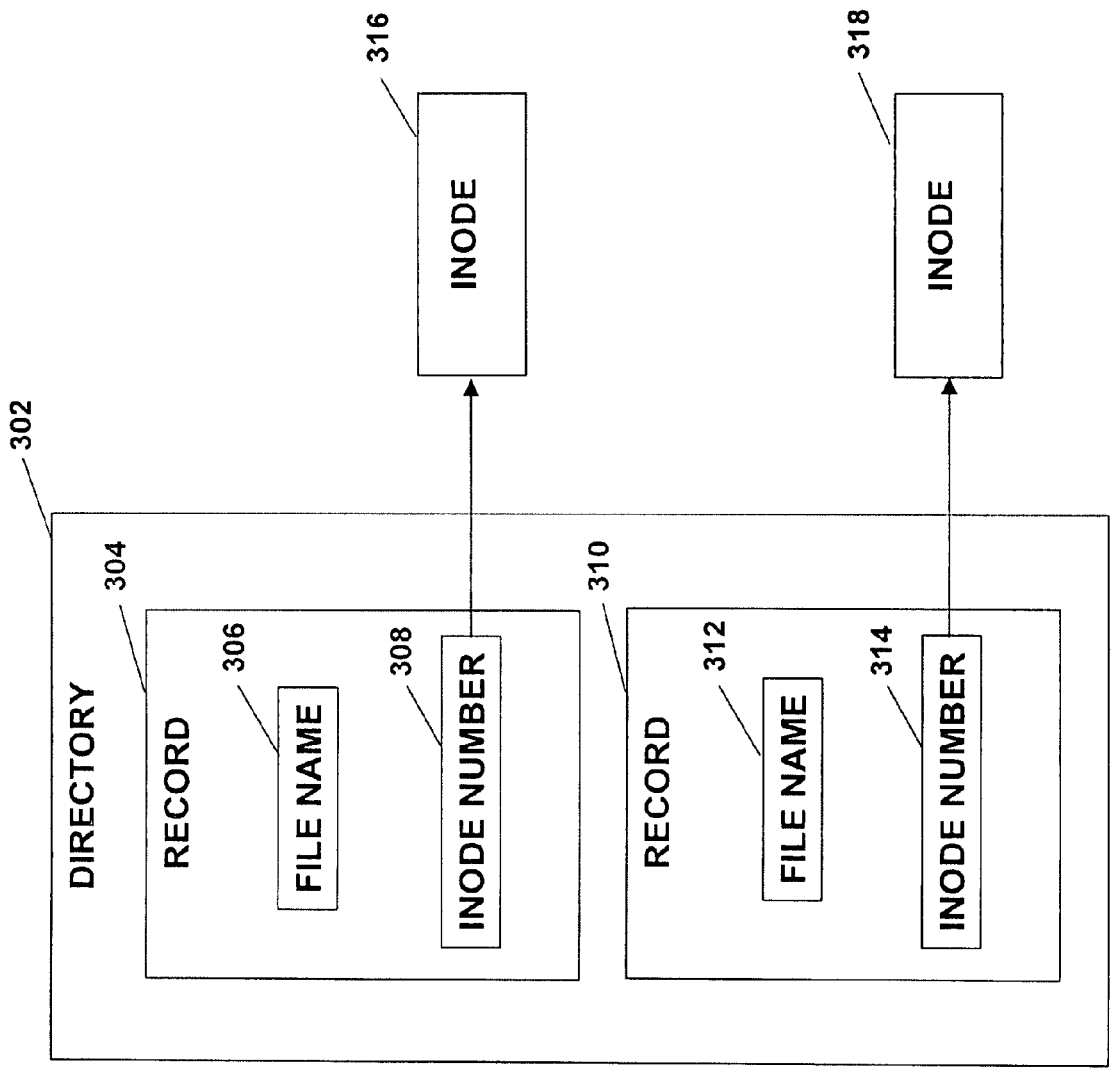
FIG. 3 is a block diagram illustrating an exemplary embodiment of a file system directory and related structure.

An exemplary file system directory structure is illustrated in FIG. 3. Directory structure 300 includes a directory file 302 that contains two directory entries, or records: a first directory record 304 and a second directory record 310. The data for first directory record 304 contains a file name 306 and an inode number 308. Directory file 302 is managed by the file system, and directory record 304 maps the user-assigned file name 306 to inode number 308 that uniquely identifies an inode 316 for the file associated with this directory entry. The structures associated with directory record 310 are similar to those associated with directory record 304.

Directory entries of this type can also be referred to as links. Such links can point to user files, other directories, or other file system objects. In exemplary file systems, directories can impose a hierarchical naming structure over the files in the file system in which the root of the hierarchy is the root directory of the file system. Files and directories within the file system are accessible from the root directory or a subdirectory from the root. A file is capable of having more than one directory entry, and thus more than one name, for the user to access it.

Exemplary file systems described herein in conjunction with exemplary embodiments of the present invention can be implemented to define the structure of data that is stored on one or more mass storage devices, support concurrently creating, modifying, and deleting multiple files on these storage devices, and be link and write consistent. A file system is said to be link consistent if every file has at least one directory entry and every directory entry links to the same file as it did when the link was created. A write consistent file system maintains the order of ordered writes within a single file or between files. For example, an application that writes to a second file after writing to a first file and forces the written data in that first file to be written to non-volatile storage requires the data to be present in the second file only if there is data in the first file. A file system that maintains this property is said to be write consistent.

The exemplary file systems described herein are snapshot file systems. Snapshot file systems are configured to capture one or more snapshots of the file system to create a dataset that preserves the state of data as it was stored within that file system at the time the snapshot was captured. A snapshot contains a copy of only file system data that has been changed since the snapshot was created, using a copy-on-write technique. The snapshot function can allow a backup or mirror program to run concurrently with user updates and still obtain a consistent copy of the file system as of the time that the snapshot was created. Snapshots can provide for an online file backup capability that allows easy recovery from common problems such as accidental deletion, and allows for comparison of a file with older versions of the file. Exemplary snapshot file systems can be implemented to create and capture snapshots that include all files in the file system to maintain a consistent file system image dataset and efficiently copy the old data in the file system prior to modification after capturing the snapshot.

In exemplary snapshot file systems, after a snapshot is captured, snapshot maintenance processing can augment modifications to the active file system. When data within the active file system is first modified after a snapshot is captured, this processing can copy the original version of that data (that is, the version of the data that existed at the time of the snapshot) into the snapshot dataset prior to modifying that data within the original file. The operation of this system results in the storage required for the contents of the snapshot to grow over time as files within the active file system are modified.

Figure 4:
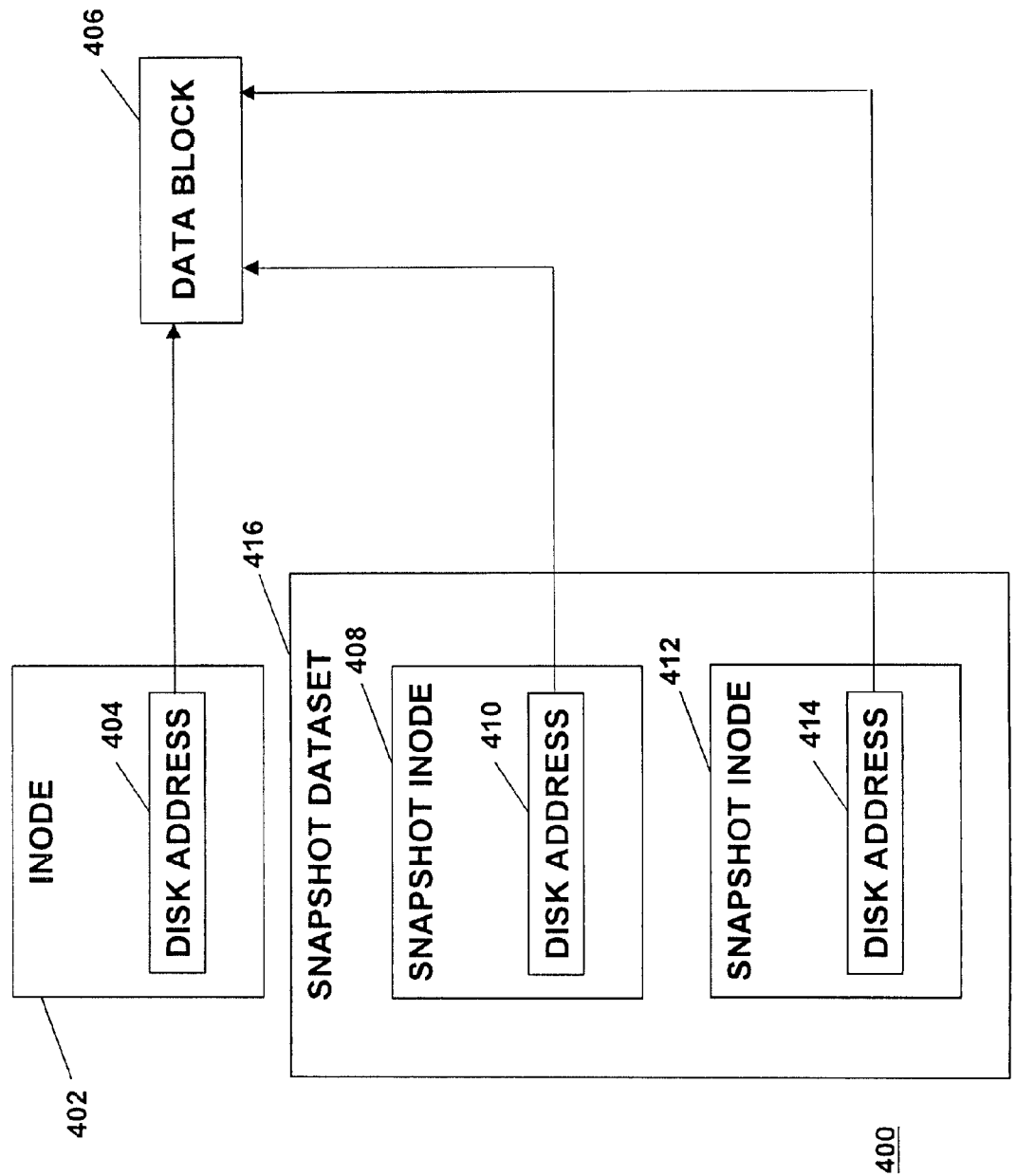
FIG. 4 is a block diagram illustrating an exemplary embodiment of a file system data structure set in which more than one inode contains the same disk address.

In exemplary snapshot file systems, a snapshot of a file in the file system image dataset can contain a copy of the file's inode as well as any indirect blocks referenced by that inode. The data block pointers in the snapshot file would refer to the same data blocks as the original file, until a copy-on-write operation creates a new data block and removes the reference. A third exemplary data structure set 400 that describes stored data within a snapshot file system of this type is illustrated in FIG. 4. Data structure set 400 contains three inodes: a first inode 402 in the active file system, a second inode 408 for an old version in a snapshot dataset 416, and a third inode 412 for another old version in the snapshot dataset that contain a first disk address 404, a second disk address 410, and a third disk address 414 respectively that each point to the same data block 406. As is shown in FIG. 4, a snapshot file system having a file for which more than one version is stored may have multiple references to a single data block.

Figure 5A:
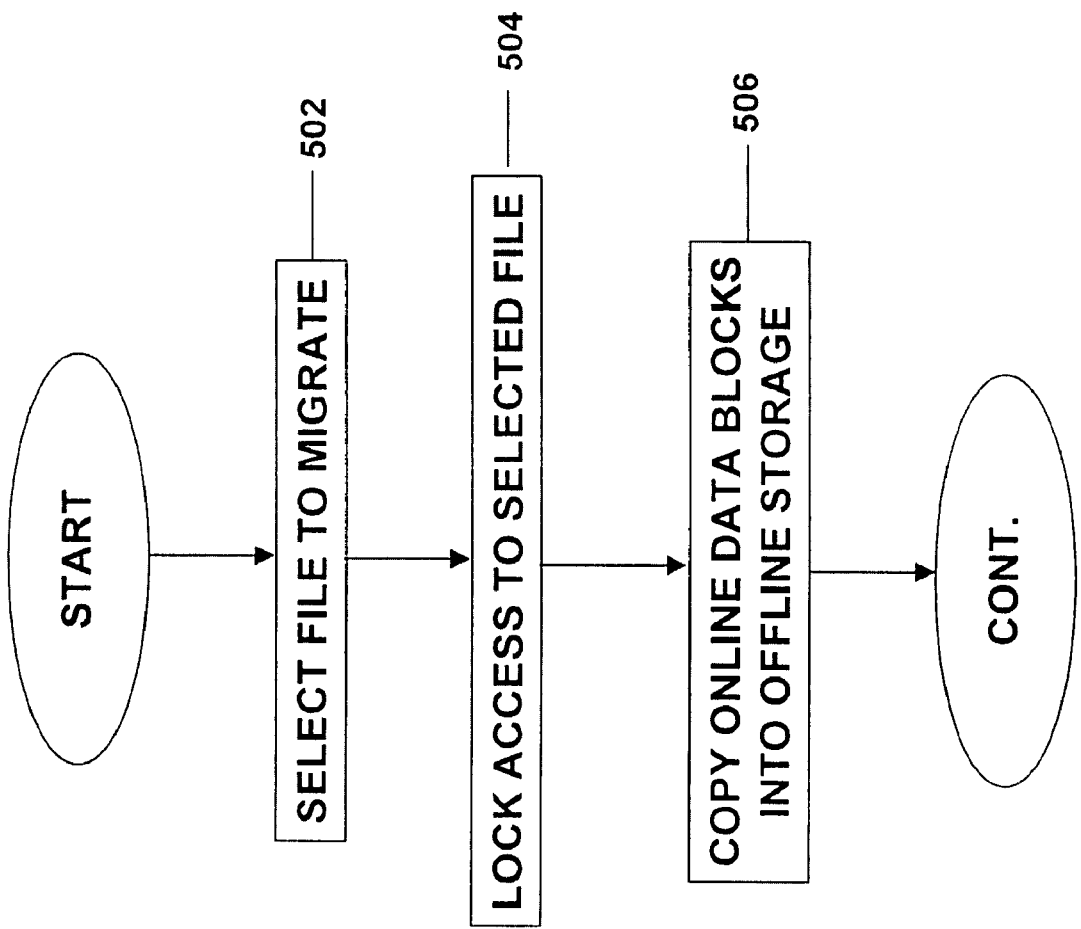
FIGS. 5A-5B depict a flowchart illustrating the overall operation and control flow of an exemplary embodiment of the present invention in which a data migration is performed by a hierarchical system manager for a snapshot file system.
Figure 5B:
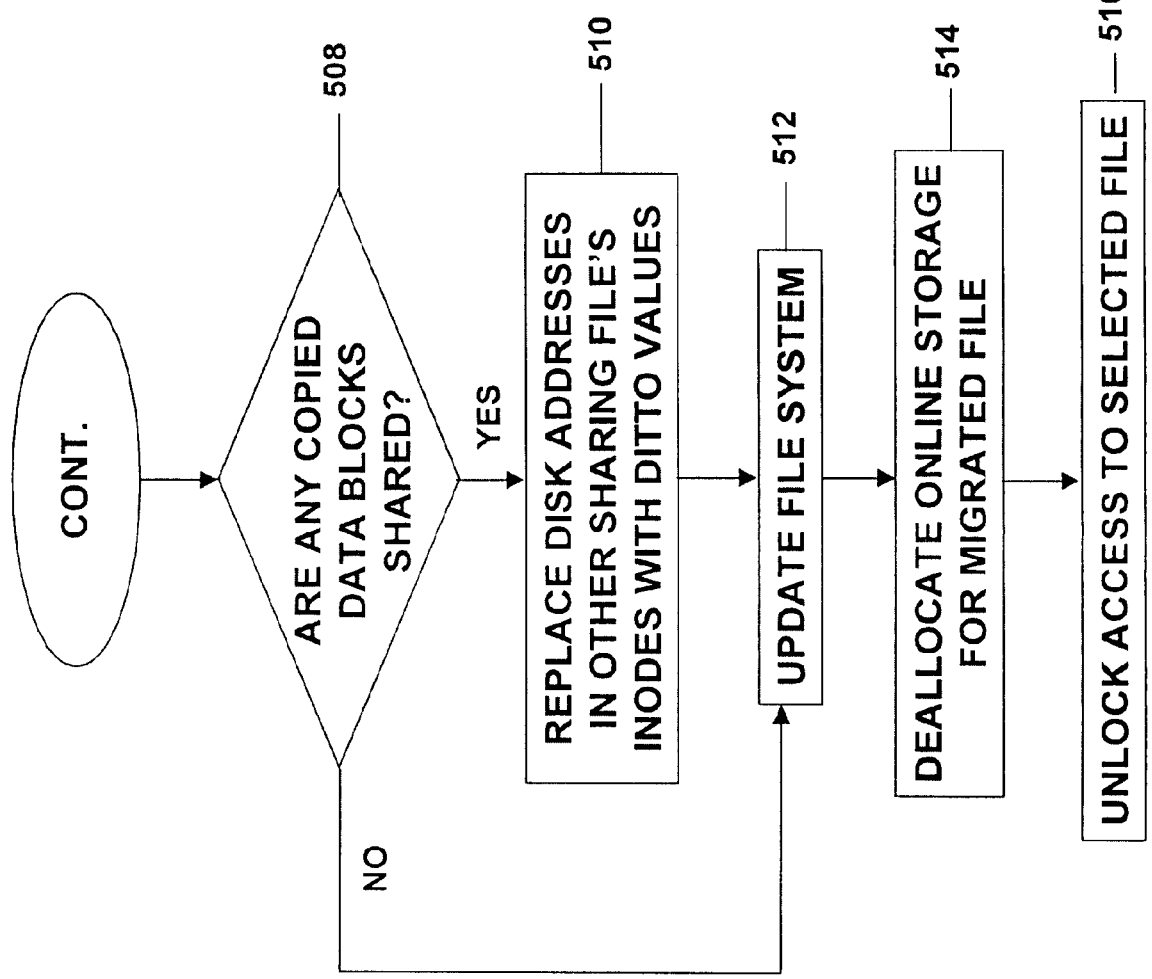

FIGS. 5A and 5B illustrate the process and control flow of an exemplary embodiment of the present invention in which a hierarchical system manager, such as HSM 106 of exemplary system architecture 100 in FIG. 1, is implemented to operate on a snapshot file system. In this exemplary embodiment, the HSM controls a partitioned or tiered hierarchy of automatic movement of the data blocks stored in the file system along a data migration and recall path between faster, online storage (for example, a hard disk drive array) in the original file system and slower, offline storage (for example, magnetic tape) connected to the HSM. The HSM continuously monitors the file system data and online storage capacity and includes policies for determining when to migrate data between the storage levels. These policies can be based on, for example, file attributes such as size, period of time since last access, and other criteria as specified by a network or system administrator. The HSM automatically recalls data that has been migrated if it is accessed by a user and restores it to its original location in the file system. In general, the HSM can operate to manage the storage of data that is organized within the file system by moving data that is infrequently accessed or otherwise deemed less critical to offline storage while presenting the impression that this data is still on disk to the end user.

In the exemplary embodiment illustrated in FIGS. 5A-5B, control flow 500 begins at the time the HSM selects a file to migrate from online storage to offline storage at step 502, and flows directly to step 504, at which the HSM locks access to the selected file to prevent concurrent updates to the file until the HSM operation completes. In the present exemplary embodiment, any file, whether it is the active version or a snapshot copy, may be selected by the HSM for migration to offline storage, and all files are migrated independently.

Upon selecting a file for migration, the HSM, at step 506 proceeds to copy each data block of the selected file to offline storage. The inode for the migrated file is retained in online storage as a "stub file" that appears as the original file to user applications to ensure transparency of the HSM operations. Optionally, in some exemplary embodiments, the HSM may leave a small amount of the original data of the selected file, such as the first data block, in online storage in the stub file. After completing the copy, the HSM then examines the inode file in the original file system, at step 508, to determine if any of the migrated data blocks are referenced by more than one snapshot version of the file. In exemplary embodiments, this determination may be made, for instance, by examining relevant state information maintained in the metadata or disk address pointer of each inode in the inode file, or by scanning the snapshot versions of the file that may have a reference the same data block.

For each version of the file that is found to reference a migrated data block, the HSM, at step 510, updates the attributes of the file's associated inode to account for the migration. This is performed by updating the disk address pointers that are contained within the inodes of the snapshot files having shared references to migrated data blocks. More specifically, the disk address pointers of the inode for the file that was actually migrated to each shared data block are left as-is, but for each subsequent snapshot file having an inode with a shared reference to a migrated data block that is found, the HSM replaces the physical disk address pointer to the shared data block in the inode with a logical "ditto" value referred to herein as a logical ditto address.

A ditto value is a reserved value indicating that the disk address value is not a real disk address and, therefore, signifies that additional processing is required to access the data. In exemplary embodiments, "ditto" values for disk addresses can be stored as '−1.' The inode file remains in the original file system and is otherwise accessed as is any other file, but because '−1' is not a valid disk block address, an application will be able to realize that this is a ditto value.

Following any updates made at step 510, the HSM, at step 512, proceeds to update the file system attributes to account for the migration and any updates made to the disk addresses of snapshot versions of the migrated file. In the present exemplary embodiment, the HSM does this by setting a "managed region" covering the migrated data, which allows it to intercept subsequent read and write operations to the migrated file and restore the migrated data as needed. So that migrated data blocks can also be restored when a snapshot versions of the file having a shared reference thereto is accessed, as will be explained below, the HSM also sets a managed region for each snapshot file for which a physical disk address pointer to a shared data block was replaced with a logical ditto value. The managed regions provide a mechanism for an application to control access to data blocks that have been migrated from the online storage space. In exemplary embodiments, each managed region can be described by its starting offset, length, and event generation flags. For example, in a managed region having offset=0, length=8192, and flags=READ|WRITE|TRUNCATE, any attempt to access file data between offset 0 and 8191 will trigger a specific event, as will be described. Actual event type depends on the type of access: for example, a write attempt generates a write event.

After updating the inode and file system attributes, the HSM, at step 514, can deallocate the online storage for each of the migrated data blocks. Because redundant physical references to each data block were converted to logical ditto addresses at step 510, the HSM can immediately reclaim the file system's online storage space for all migrated data blocks regardless of the number of references to any shared data block. After deleting the original data blocks in this manner, the HSM, at step 516, unlocks access to the selected file, which allows any pending operations on that file to be processed, and normal file system activity for the original data file resumes. Deferred updates are processed and applications are again able to access the original file system data.

After a file in a file system has been migrated to offline storage by an HSM, the HSM may subsequently decide to migrate a file having an inode that now contains a logical ditto address pointer to a shared data block that has already been migrated. In an exemplary embodiment of the present invention, this type of migration can proceed according to exemplary control flow 500 as described above, except that rather than copying the already migrated data block that is shared by the selected file to offline storage, the HSM, at step 506, will detect the ditto value identifying the data block as having already been migrated and will thereby know to avoid copying it and storing it redundantly. The HSM will only copy online data blocks that are referenced with physical block addresses in the inodes to offline storage at step 506. That is, in the present exemplary embodiment, if a data block has not already been moved to offline storage in another migration, it will be copied and deallocated according to steps 506-514 as described above, but if an inode provides a logical ditto address, the HSM will not make a redundant copy of the data block in offline storage. In such a situation, the HSM will preserve the offset of the ditto addresses within the migrated file, as this information is needed for restoring the data and re-establishing the multiple shared references to each shared data block, as will be described. In exemplary embodiments, this can be accomplished, for instance, by recording the ranges of ditto addresses, providing a bitmap indicating each ditto address, or retaining the migrated file's data block pointers.

In an alternative exemplary embodiment, the HSM can be implemented so that it does not immediately reclaim the disk space of shared disk blocks when migrating a file to offline storage, but rather, will wait until every snapshot file that refers to the shared data block has been migrated to offline storage as well. In this exemplary embodiment, the HSM will retain the physical disk address pointer to the data block when generating ditto values so that reading a snapshot file will not require the act of restoring the original file from offline storage. While the file system will wait longer to reclaim the disk space for migrated data blocks in this exemplary embodiment, offline storage access can be avoided when reading snapshot files. For file system operation in which accesses to snapshot files are common even if the original file has not been accessed for a long time, this alternative implementation may provide a better trade-off in terms of overall workload.

Exemplary embodiments of the present invention can be implemented for snapshot file systems employing hierarchical system management and an interface providing for user or application accesses to files such as, for example, a standard POSIX file system interface, to support user accesses to files that have been migrated from to offline storage. These accesses may be processed in several different ways, depending on the types of access and the location of the files.

Figure 6:
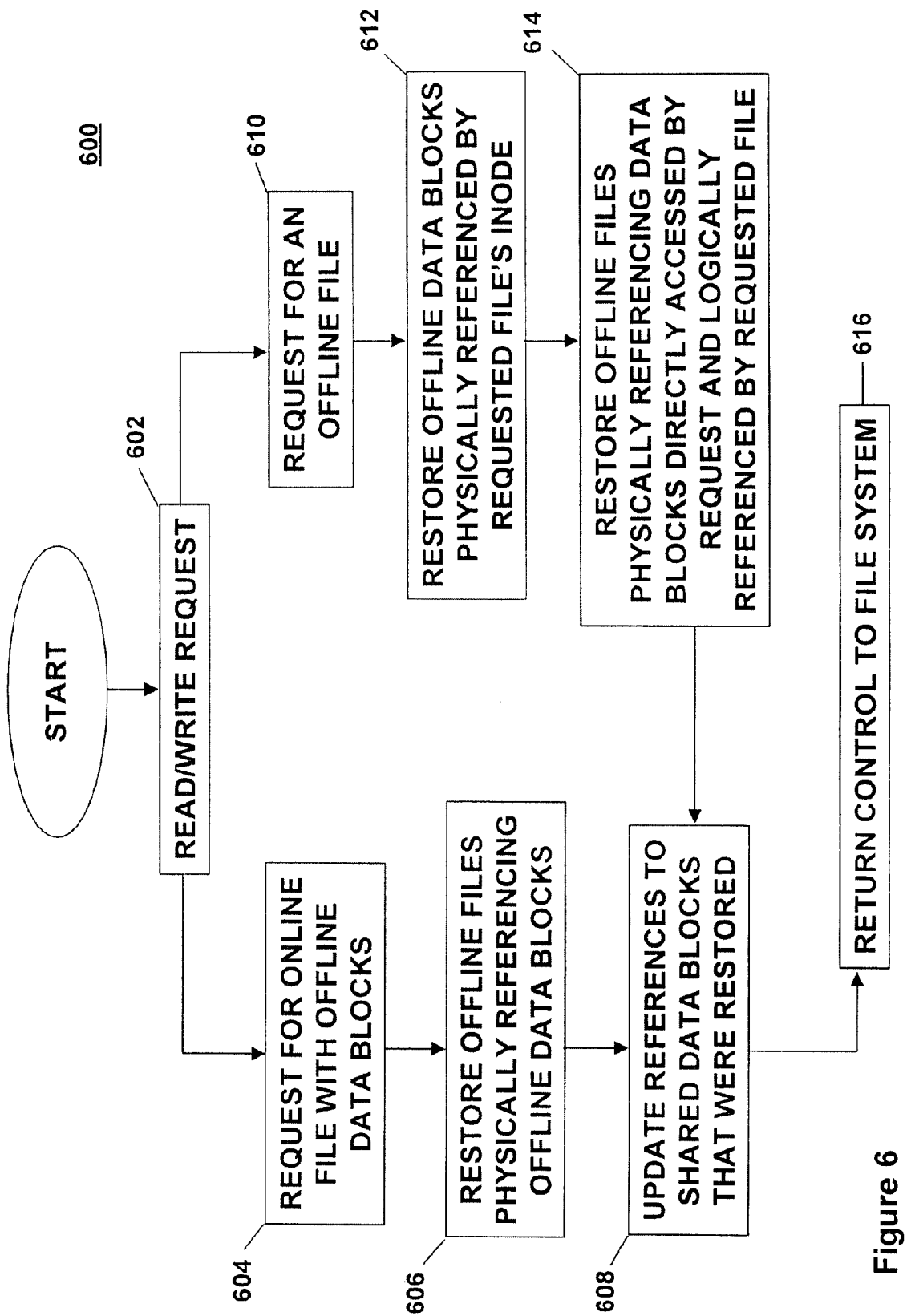
FIG. 6 is a flowchart depicting the overall operation and control flow of an exemplary embodiment of the present invention in which a restore of offline data is performed by a hierarchical system manager for a snapshot file system during a read or write request.

For example, users or other processes may make a request to read or modify data that has been migrated to offline storage and, as a result, needs to be restored to online storage by the HSM. In such a situation, a migrated data block that needs to be restored to satisfy a read or write access to a file may have been migrated with either the file or with another snapshot version of the file with which the actual file being accessed has a shared data block reference that was modified to a ditto value during the migration. FIG. 6 illustrates the process and control flow of an exemplary embodiment of the present invention in which data that has been migrated according to exemplary control flow 500 described above is restored by the HSM to satisfy a read or write request.

In the exemplary embodiment illustrated in FIG. 6, control flow 600 begins when the read or write request is made at step 602. The process will then proceed, according to the current storage situation for the data blocks referenced by the file being accessed. If the request is made to access an online file that has a logical ditto address signifying a reference to a migrated data block in its inode, the managed region set up by the HSM to cover the logical ditto addresses of the file being accessed will, at step 604, intercept the read or write request and indicate to the HSM that the migrated data needs to be restored from offline storage. The ditto value stored in the disk address signifies an inferred reference that the HSM will need to retrieve the actual disk address for the migrated data block using the disk address within the inode of the migrated file. The HSM will therefore treat the request as if it were an access to the migrated file that contains the data block that was referenced by the online file's inode before the physical disk address was converted to a logical ditto address. The HSM, at step 606, will restore the migrated file to online storage in the manner described below for when the read or write request is made directly to an offline file.

In the present exemplary embodiment, if the read or write request is instead made to access an offline file, the process will proceed from step 602 to step 610, at which the managed region set up by the HSM to cover the migrated file will intercept the request and indicate to the HSM that the migrated data needs to be restored from offline storage. The HSM will then, at step 612, restore the migrated data blocks that are referenced by a physical (that is, non-ditto) disk address in the file's inode. For any disk address in the file's inode that is marked with a ditto value, if the read or write request is directed to the specific migrated data block represented by the ditto value, the HSM will, at step 614, as in step 606 for a request made to an online file that has a logical ditto address, treat the request as if it were an access to the migrated file that contains the data block that was referenced by the inode of the online file before its physical disk address was converted to a logical ditto address. The HSM, however, will not restore data that corresponds to any other disk address in the originally accessed file's inode that is marked with a ditto value. Hence, the restore operation may leave logical ditto addresses intact in the inode for the accessed file in some instances.

After restoring the necessary data blocks from offline storage in this manner, the HSM, at step 608, proceeds to update the disk address references to shared data blocks that were restored, and then returns control to the file system at step 616 so that the now-restored data can be accessed to satisfy the original file request and normal file system activity for the original data file can resume. In exemplary embodiments, for each restored data block that is shared by multiple references, the HSM, using the locations of the logical ditto addresses that were preserved when the files having the ditto values were migrated, can, at step 608, restore the physical disk address in the files so that each migrated data block requires only one restoration operation and only a single new block allocation in online storage. That is, once a data block has been restored in a read or write request, the HSM may, if desired, replace any or all of the corresponding logical ditto addresses with the physical disk address of the restored data block.

In alternative exemplary embodiments, updates to the corresponding logical ditto addresses may be deferred until a subsequent reference is made and may thereby be avoided if the file is deleted without a subsequent access having been made. For example, if the access made to the file is a write request to overwrite a whole data block, if the HSM only replaces logical ditto addresses in the restored file, it may avoid the copy-on-write penalty normally incurred on writes to shared data blocks when the original data is copied to a new disk block prior to being updated. In this example, the HSM allocates a new data block for the data being written to, but keeps the original shared copy of the data block in offline storage until, and if, an access is made to one of the other logical ditto addresses to the shared data block, or until all the files having the other logical ditto addresses are deleted. That is, the HSM maintains the association between the disk address of the migrated data block and the disk address associated with the other ditto values, and replaces the disk address (ditto or physical) in the inode of the original file with the address of the newly allocated data block in online storage. This saves the disk I/O associated with restoring the original data from the original data block when the original file will no longer need the original data, if and until the original data block is accessed.

Figure 7:
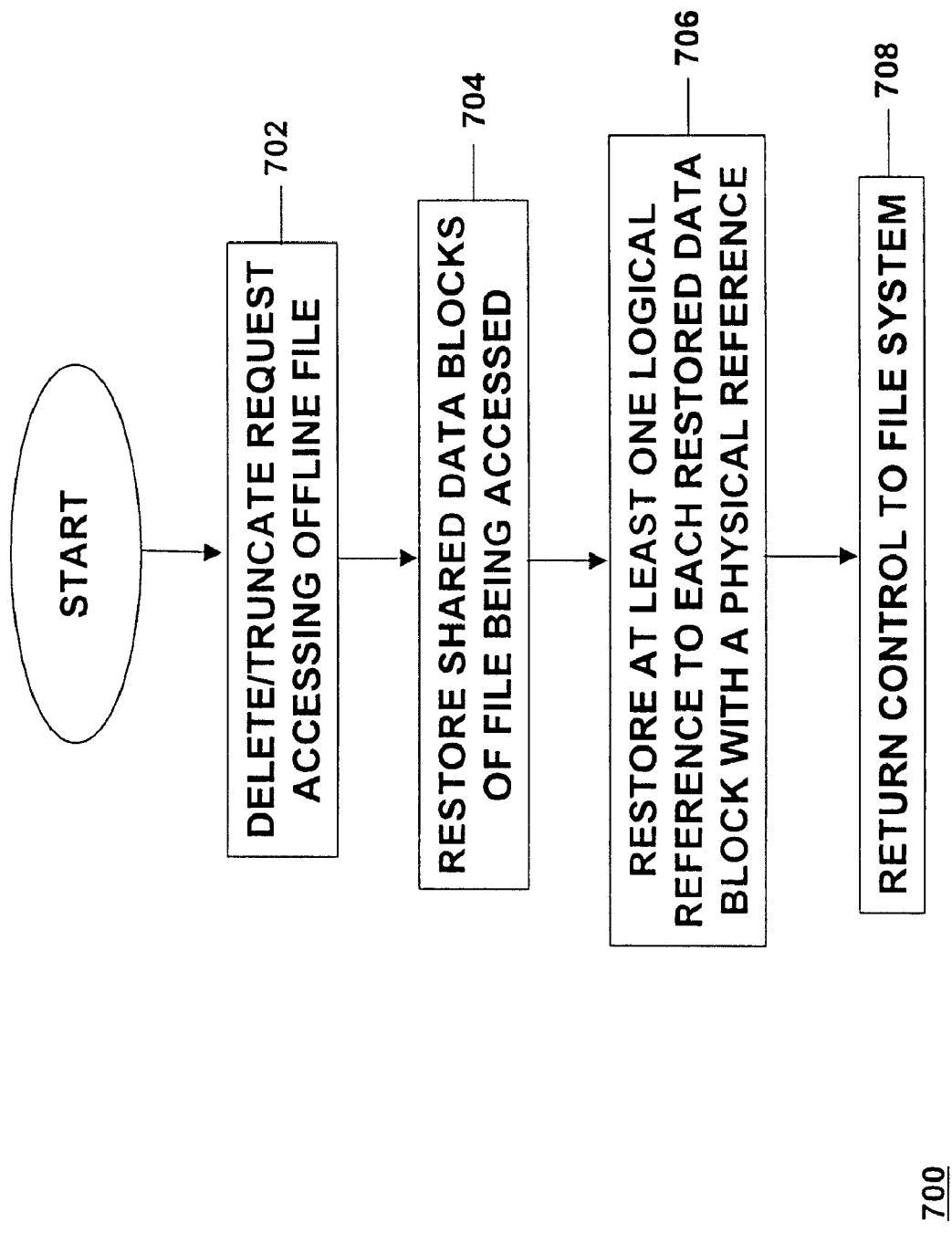
FIG. 7 is a flowchart depicting the overall operation and control flow of an exemplary embodiment of the present invention in which a restore of offline data is performed by a hierarchical system manager for a snapshot file system during a delete or truncate request.

In other file access scenarios, users or processes may make a request to delete or truncate a file having one or more shared data blocks that have been migrated to offline storage. In these instances, the HSM must preserve the shared data. FIG. 7 illustrates the process and control flow of an exemplary embodiment of the present invention in which data that has been migrated according to exemplary control flow 500 as described above is restored by the HSM to satisfy a delete or truncate request.

In the exemplary embodiment illustrated in FIG. 7, control flow 700 begins at the time the delete or truncate request is made at step 702. The HSM proceeds, at step 704, to restore each shared data block that is physically referenced by the inode of file being accessed by the current request. For each shared data block that was restored, the HSM, at step 706, replaces the ditto value(s) within the inode of at least one of the other files sharing a reference to the restored data block with the corresponding physical disk address. The HSM then returns control to the file system at step 708 so that the appropriate data space can be deallocated to satisfy the original file request and normal file system activity for the original data file can resume.

In an alternative exemplary embodiment, the HSM does not need to perform restore operations upon a delete or truncate request to a file having one or more shared data blocks that have been migrated to offline storage. Rather, the HSM could assign ownership of the offline shared data blocks to one of the files having a reference to the shared data block. This change in ownership could be made by updating the relevant metadata that is contained within the inode of the file, which would allow the file system to avoid having the HSM restore the data until it is needed, for example, to satisfy a read or write access to the data block.

Figure 8A:
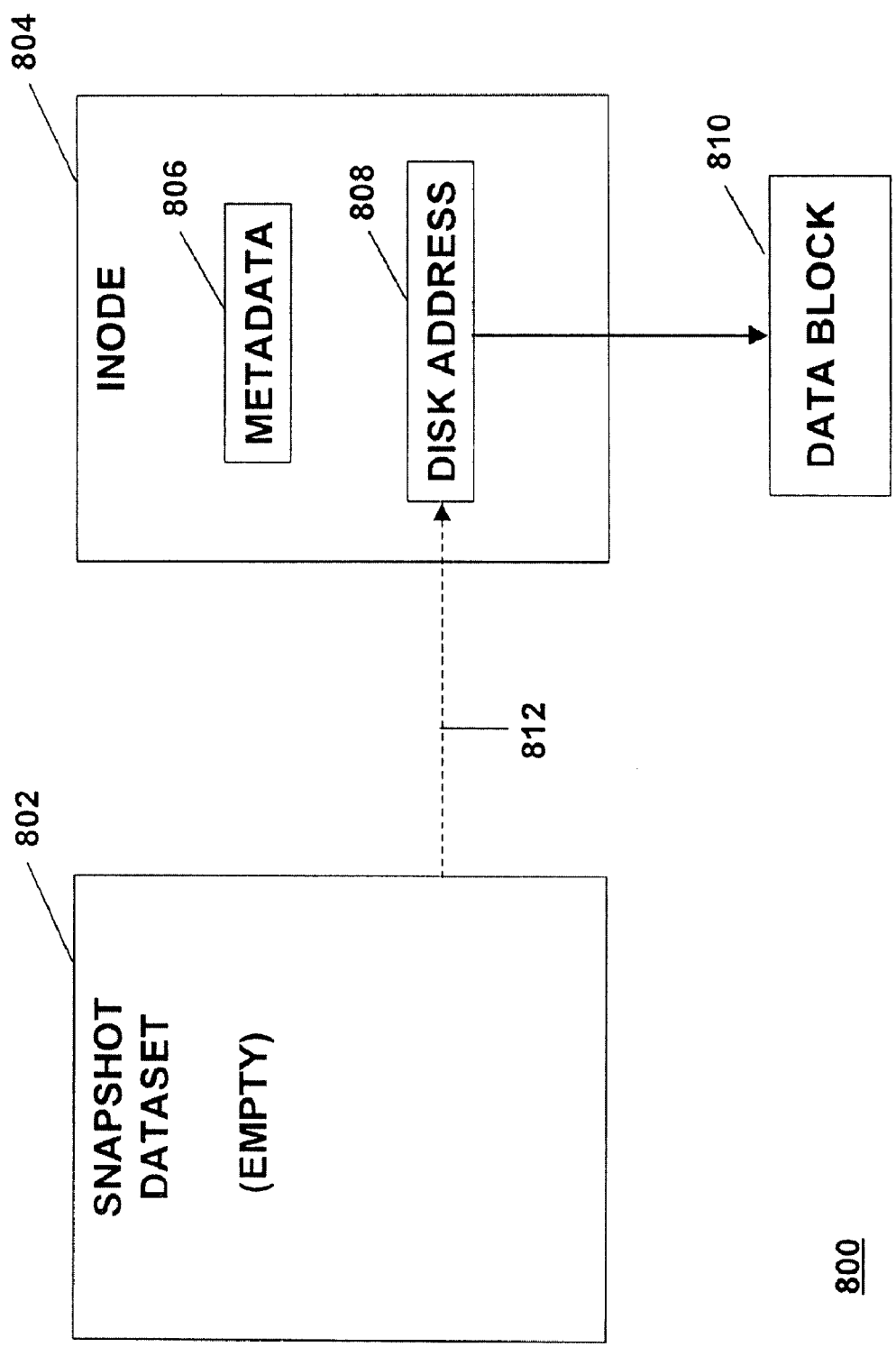
FIG. 8A is a block diagram illustrating the structure of a snapshot upon generation in an exemplary embodiment of a file system data structure set.
Figure 8B:
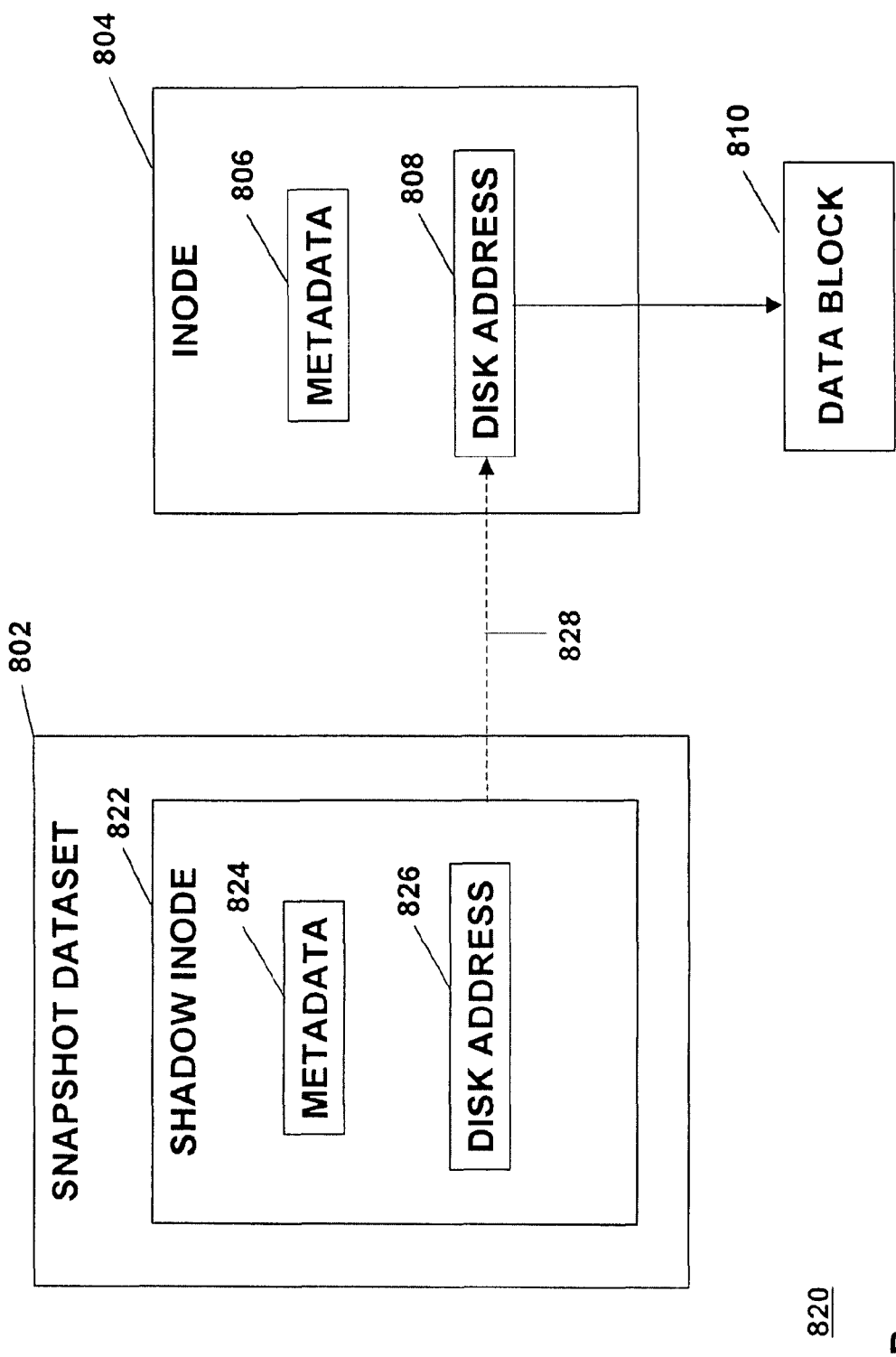
FIG. 8B is a block diagram illustrating the structure of a shadow inode upon attribute modification of the corresponding source file in an exemplary embodiment of a file system data structure set.
Figure 8C:
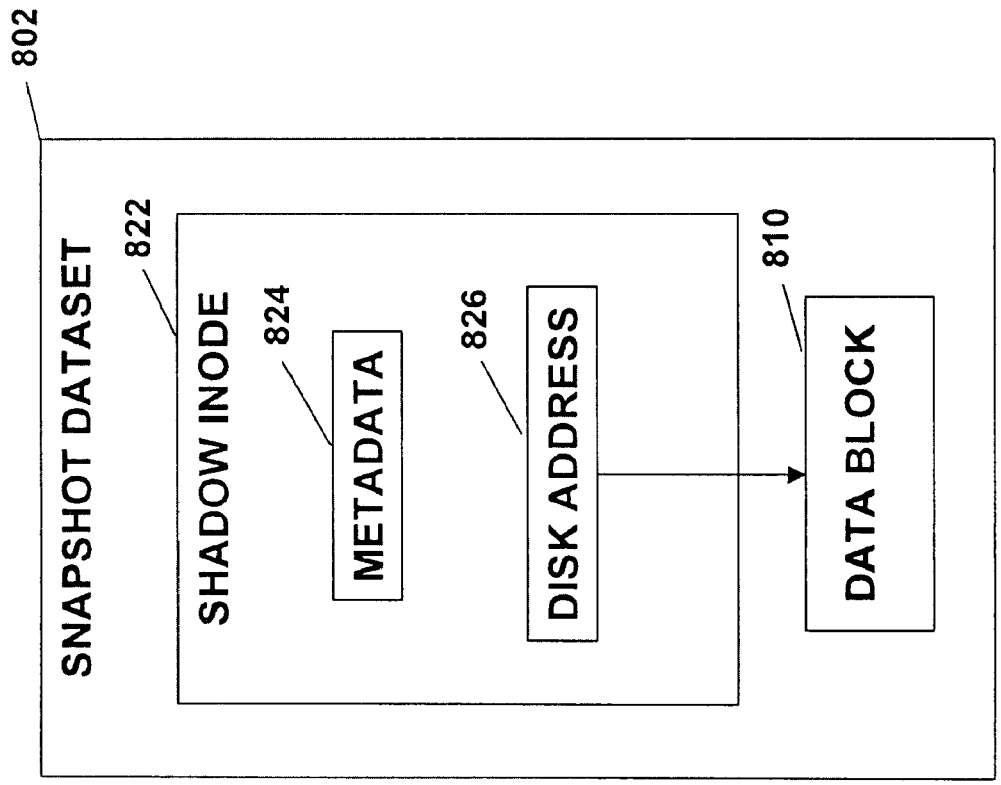
FIG. 8C is a block diagram illustrating the structure of a shadow inode upon an overwrite of the corresponding source file in an exemplary embodiment of a file system data structure set.

Referring now to FIGS. 8A-8C, examples of a third type of data structure set that is associated with data stored within an alternative exemplary file system are illustrated. This type of file system implements snapshots differently from the other exemplary file systems described above by creating snapshot datasets that utilize inferred logical ditto address pointers to refer to data in a more recent version of a file instead of creating multiple physical references to an original data block in the online storage (that is, prior to data migration).

FIG. 8A illustrates a schematic diagram of an initial snapshot dataset structure 800 associated with this alternative snapshot file system. A snapshot dataset 802 is shown as being empty and represents a snapshot when the original file system has not been updated since the snapshot was captured. The processing used to retrieve data from a snapshot dataset first examines the inode file of the snapshot to determine if valid inode data exists within snapshot dataset 802 for the data file being retrieved. The absence of inode data within the snapshot dataset 802 signifies that the requested data has not been modified since the snapshot was captured and that the requested data "within" that snapshot is in the original data file of the active file system. This results in an inferred reference 812 to an inode 804 of the active file system to access the requested data block.

When an attempt to access a data block 810 within a captured snapshot is made, and the snapshot dataset does not contain data for the inode associated with the requested data file, the data block is accessed using a physical disk address 808 within inode 804 of the active file system. Similarly, when there is no valid inode data within snapshot dataset 802, metadata for a file is accessed using an inferred reference to a metadata set 806 within inode 804 of the active file system.

FIG. 8B illustrates an example of an updated attribute data structure 820 associated with this exemplary file system. In data structure 820, a shadow inode 822 is stored within snapshot dataset 802. The shadow inode 822 represents an inode of a data file that was captured into snapshot dataset 802 in which the file attributes of the inode stored in a metadata node 824 have been changed since the snapshot was captured. The inode data has been copied from the active file system into snapshot dataset 802 prior to updating the inode metadata within the active file system. This structure results in metadata node 824 containing the attributes that were present in the associated file when the snapshot was captured.

A disk address 826 within shadow inode 822 contains a '−1' ditto value to indicate that this is a shadow inode and that the true disk address for actual data block 810 is stored in inode 804 of the active file system. The ditto value stored in disk address 826 signifies an inferred reference 828 indicating that the actual disk address for data block 810, which is still part of the original file in this scenario, should be retrieved using disk address 808 within inode 804 of the active file system. Thus, the file attributes from the original inode are copied as-is, but the disk address within the shadow inode stored in the snapshot inode file is replaced with a logical ditto address.

FIG. 8C illustrates an example of an updated data block storage data structure 830 associated with this alternative exemplary file system. Data block storage data structure 830 represents data block 810 that has been updated since the snapshot was captured. Snapshot dataset 802 the data block 810 that was in the active file system prior to updating of that data block has been moved or copied to snapshot dataset 802 after the snapshot was captured. Data block storage data structure 830 illustrates that shadow inode 822 within the snapshot dataset 802 contains not only valid metadata 824 but also now a valid physical reference in disk address 826. Disk address 826 indicates the storage location of data block 810, which is now part of snapshot dataset 802.

In exemplary embodiments of the present invention, an HSM can implemented in conjunction with an offline storage system and a snapshot file system of this alternative type to automatically move data within the file system between online storage devices and offline storage. In one exemplary embodiment, the HSM may be implemented to perform data migrations and restore data upon file access requests in a similar manner to that described above in relation to exemplary control flows 500, 600, and 700, with a few exceptions that will now be described.

In the present exemplary embodiment, step 510 in exemplary control flow 500, converting the physical disk addresses in the inodes of files that also reference the migrated data to ditto values after a file is migrated, is not performed. Rather, the disk space occupied by the file is deallocated immediately following migration. This is because any shared data blocks referenced by the file being migrated will already be referenced by logical ditto addresses within other file's inodes regardless of whether the data block is stored online or has been migrated offline. Additionally, at step 512 in exemplary control flow 500, there is no need for the HSM to set up managed regions for snapshot file versions that contain logical ditto addresses, as this type of snapshot file system is already configured to implement the ditto resolution. Moreover, in the present exemplary embodiment, upon a read or write request to an online file having a logical ditto address, the file system will resolve the ditto address to the migrated file. As a result, the HSM can restore the data block to that file without converting any other ditto values that refer to the restored data block. That is, upon restoration of a shared data block to online storage, the HSM will not restore any physical references to the data block.

Figure 9:
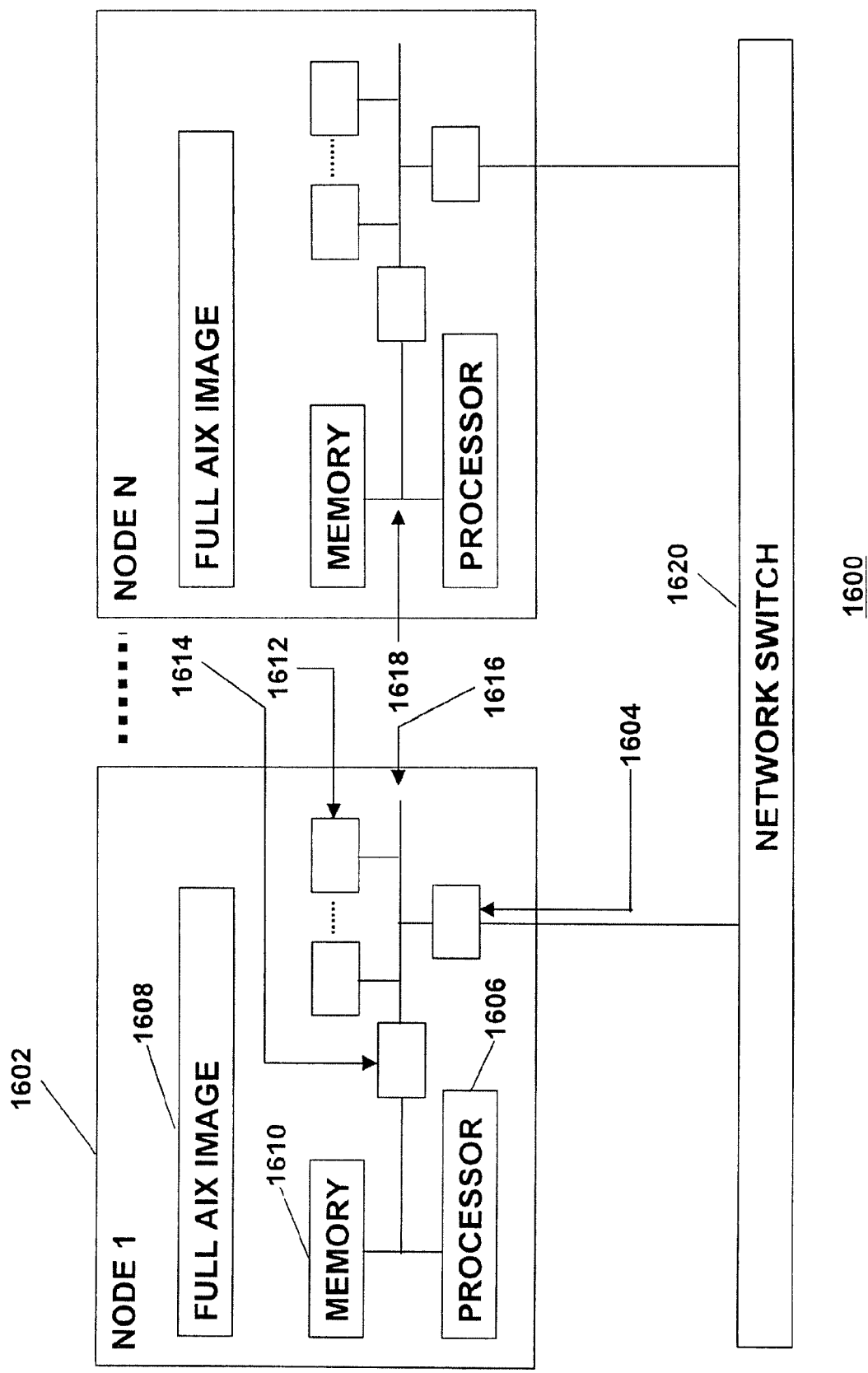
FIG. 9 is a block diagram illustrating an exemplary embodiment of a multi-processor computer system.

Exemplary embodiments of the present invention can be implemented to operate in a centralized fashion in a single computer system or within a distributed computing architecture in which different elements are spread across several interconnected computer systems. FIG. 9 illustrates a block diagram of an exemplary distributed computing environment 1600 that includes a plurality of nodes 1602 coupled to one another via a plurality of network adapters 1604. Each node 1602 is an independent computer with its own operating system image 1608, memory 1610, and processor(s) 1606 on a system memory bus 1618. A system input/output bus 1616 couples I/O adapters 1612 and a network adapter 1604. Each of the network adapters are linked to one another via a network switch 1620. In exemplary embodiments, the network can be a fiber optic network with a corresponding fiber optic network switch.

Exemplary embodiments can, for instance, be implemented to operate on distributed computing environment 1600 that include N nodes 1602 with one or more processors 1606. In exemplary embodiments, each processing node is a RISC/6000 computer running the AIX operating system. In alternative exemplary embodiments, some or all of processing nodes 1602 can include different types of computers and/or different operating systems 1608.

Exemplary embodiments of present invention can be implemented and realized in hardware, software, or a combination of hardware and software. A system according to an exemplary embodiment can be realized in a centralized fashion in one computer system or in a distributed fashion where different elements are spread across several interconnected computer systems. An exemplary combination of hardware and software could be a general purpose computer system with a computer program that, when being loaded and executed, controls the computer system such that it carries out the methods described herein.

Exemplary embodiments of the present invention can also be embedded in a computer program product, which comprises features enabling the implementation of the methods described herein, and which—when loaded in a computer system—is able to carry out these methods. Computer program means or computer program in the present context can mean any expression, in any language, code, or notation, of a set of instructions intended to cause a system having an information processing capability to perform a particular function either directly or after either or both of the following a) conversion to another language, code or, notation; and b) reproduction in a different material form.

Exemplary embodiments of the present invention can be implemented on any kind of computer system or other apparatus that can adapted for carrying out the methods and/or functions described herein. An exemplary computer system may include, inter alia, one or more computers and at least a computer readable medium allowing the computer system to read data, instructions, messages or message packets, and other computer readable information from the computer readable medium. The computer readable medium may include, for example, non-volatile memory, such as ROM, Flash memory, Disk drive memory, CD-ROM, and other permanent storage, as well as, for example, volatile storage such as RAM, buffers, cache memory, and network circuits. Additionally, the computer readable medium may comprise computer readable information in a transitory state medium such as a network link and/or a network interface, including a wired network or a wireless network, which allows a computer system to read such computer readable information.

Figure 10:
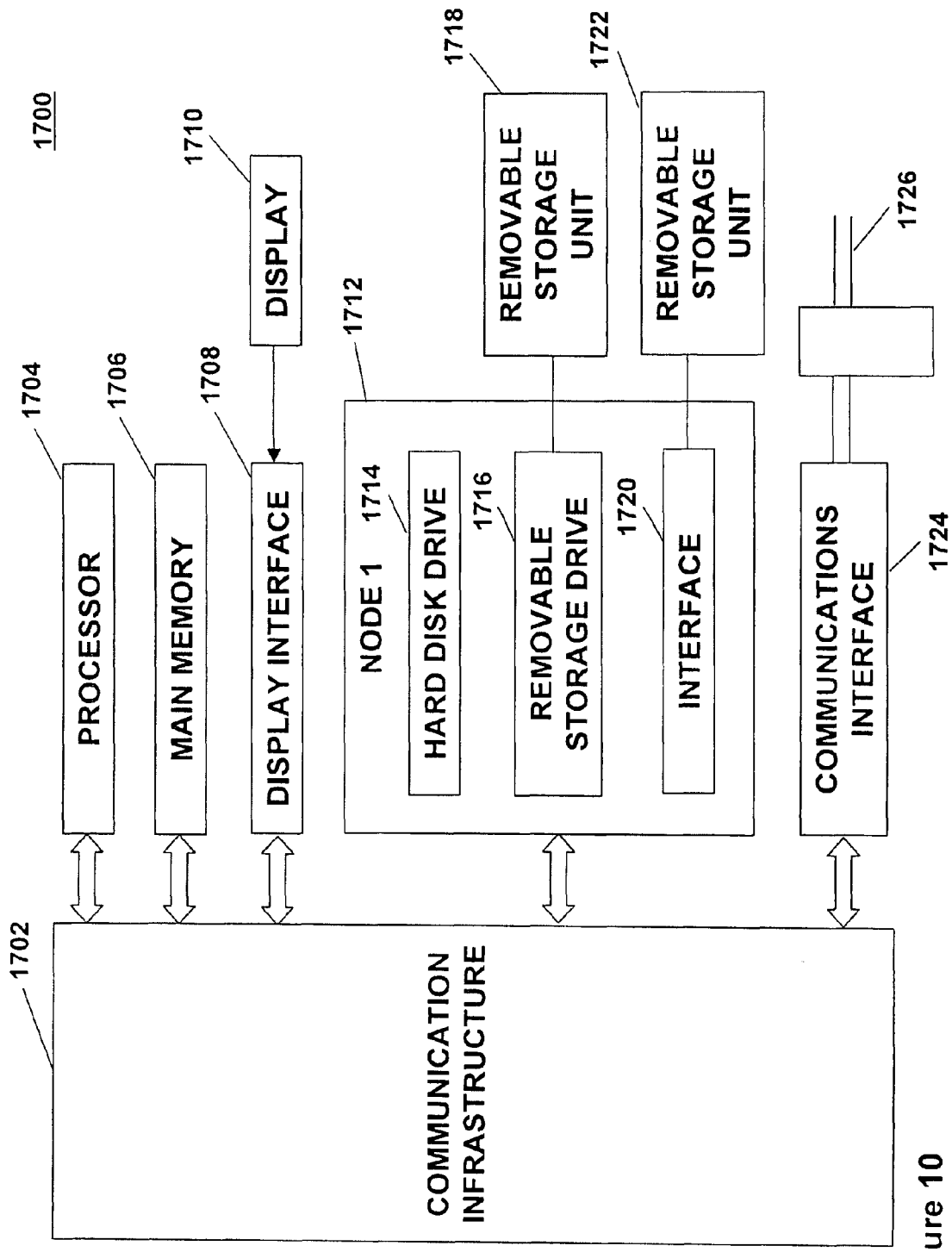
FIG. 10 is a block diagram illustrating an exemplary embodiment of a computer system.

An exemplary computer system 1700 is illustrated in FIG. 10. Computer system 1700 includes one or more processors, such as processor 1704. Processor 1704 is connected to a communication infrastructure 1702 (for example, a communications bus, cross-over bar, or network). Exemplary embodiments of the present invention are described herein in terms of this exemplary computer system. After reading this description, it will become apparent to a person of ordinary skill how to implement exemplary embodiments of the present invention using other computer systems and/or computer architectures.

Exemplary computer system 1700 includes a display interface 1708 that forwards graphics, text, and other data from the communication infrastructure 1702 (or from a frame buffer not shown) for display on the display unit 1710. Computer system 1700 also includes a main memory 1706, preferably random access memory (RAM), and a secondary memory 1712. Secondary memory 1712 may include, for example, a hard disk drive 1714 and/or a removable storage drive 1716, representing a floppy disk drive, a magnetic tape drive, an optical disk drive, etc. Removable storage drive 1716 reads from and/or writes to a removable storage unit 1718. Removable storage unit 1718, represents a floppy disk, magnetic tape, optical disk, etc. which is read by and written to by removable storage drive 1716. As will be appreciated, removable storage unit 1718 includes a computer usable storage medium having stored therein computer software and/or data.

Exemplary secondary memory 1712 may include other similar means for allowing computer programs or other instructions to be loaded into computer system 1700. Such means may include, for example, a removable storage unit 1722 and an interface 1720. Examples of such include a program cartridge and cartridge interface (such as that found in video game devices), a removable memory chip (such as an EPROM, or PROM) and associated socket, and other removable storage units 1722 and interfaces 1720 which allow software and data to be transferred from removable storage unit 1722 to computer system 1700.

Exemplary computer system 1700 may also include a communications interface 1724. Communications interface 1724 allows software and data to be transferred between computer system 1700 and external devices. Examples of communications interface 1724 may include a modem, a network interface (such as an Ethernet card), a communications port, a PCMCIA slot and card, etc. Software and data transferred via communications interface 1724 are in the form of signals that may be, for example, electronic, electromagnetic, optical, or other signals capable of being received by communications interface 1724. These signals are provided to communications interface 1724 via a communications path, or channel, 1726. Channel 1726 carries signals and may be implemented using wire or cable, fiber optics, a phone line, a cellular phone link, an RF link, and/or other communications channels.

There terms "computer program medium," "computer usable medium," and "computer readable medium" are used herein can refer generally to media such as main memory 1706 and secondary memory 1712, removable storage drive 1716, a hard disk installed in hard disk drive 1714, and signals. These computer program products are means for providing software to computer system 1700. The computer readable medium allows computer system 1700 to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems 1700. Furthermore, the computer readable medium may comprise computer readable information in a transitory state medium such as a network link and/or a network interface, including a wired network or a wireless network, which allows a computer to read such computer readable information.

Computer programs (also called computer control logic) are stored in main memory 1706 and/or secondary memory 1712. Computer programs may also be received via communications interface 1724. In particular, the computer programs, when executed, enable processor 1704 to perform the features of computer system 1700. Accordingly, such computer programs represent controllers of the computer system 1700. Such computer programs can be implemented so as to enable the computer system 1700 to perform the features of the exemplary embodiments of the present invention as discussed herein when executed.

Therefore, one or more aspects of exemplary embodiments of the present invention can be included in an article of manufacture (for example, one or more computer program products) having, for instance, computer usable media. The media has embodied therein, for instance, computer readable program code means for providing and facilitating the capabilities of the present invention. The article of manufacture can be included as a part of a computer system or sold separately. Furthermore, at least one program storage device readable by a machine, tangibly embodying at least one program of instructions executable by the machine to perform the capabilities of the exemplary embodiments of the present invention described above can be provided.

Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations of the aspects described herein in relation to exemplary embodiments of the present invention need be implemented in methods, systems, and/or apparatuses.

Although exemplary embodiments of the present invention have been described in detail, it should be understood that various changes, substitutions and alternations can be made therein without departing from spirit and scope of the inventions as defined by the appended claims. The scope of the present invention is not to be restricted, therefore, to the exemplary embodiments disclosed herein. Furthermore, it is intended that the appended claims cover any and all such applications, modifications, and embodiments within the scope of the present invention. It should be understood that those skilled in the art, both now and in the future, may make various modifications without departing from the spirit and the scope of the present invention as set forth in the appended claims. Therefore, the following claims should be construed to maintain the proper protection for the present invention.

What is claimed is:

1. A file storage management method, the method comprising:
providing an inode of a first file that includes at least one reference, where the at least one reference includes a physical disk address of a data block of the first file;
providing an inode of a snapshot file of the first file, where the inode includes at least one reference that includes the physical disk address of the data block of the first file;
copying the at least one data block of the first file from a first storage level to a second storage level;
updating the at least one reference of the inode of the snapshot file with a logical value, where the logical value includes a value indicating that additional processing is required to obtain the physical disk address of the data block of the first file; and
providing a managed region that controls access to the data block through the inode of the first file.

2. The method of claim 1, further comprising:
deallocating the data block of the first file.

3. The method of claim 2, further comprising:
copying at least one data block of the snapshot file from the first storage level to the second storage level.

4. The method of claim 3, wherein the deallocating comprises delaying the deallocating the data block of the first file until after the copying of the at least one data block of the snapshot file is complete.

5. The method of claim 1, wherein the updating the at least one reference occurs when the snapshot file is generated.

6. The method of claim 5, further comprising converting the logical value to a physical disk address when the data block is modified.

7. The method of claim 1, wherein the updating the at least one reference occurs once the copying is complete.

8. The method of claim 1, further comprising:
receiving a request to read or modify the first file;
using the managed region, restoring the at least one data block of the first file to the first file storage level; and
satisfying the request to read or modify the first file.

9. The method of claim 1, further comprising:
receiving a request to read or modify the snapshot file;
when the logical value is maintained in the reference of the inode of the snapshot file, restoring the data block of the first file to the first storage level using the managed region; and
satisfying the request to read or modify the snapshot file.

10. The method of claim 3, further comprising:
receiving a request to read or modify the snapshot file;
when the physical disk address is maintained in a reference of the inode of the snapshot file, restoring the data block of the snapshot file to the first storage level using the managed region;
when the logical value is maintained in the reference of the inode of the snapshot file, restoring the data block of the first file to the first storage level using the managed region; and
satisfying the request to read or modify the snapshot file.

11. The method of claim 10, further comprising:
updating the logical value of the reference of the inode of the snapshot file with a physical disk address.

12. The method of claim 1, further comprising:
receiving a request to delete or truncate the first file;
restoring the at least one data block of the first file to the first storage level; and
updating the logical value of the reference of the inode of the snapshot file with a physical disk address.

13. The method of claim 1, wherein the inode of the first file includes a disk address pointer to one or more indirect data blocks that contain at least one reference to a data block of the first file.

14. The method of claim 1, wherein the first storage level is an online memory device under the control of a processing unit upon which a file system is executed.

15. The method of claim 14, wherein the online memory device comprises a hard disk drive array.

16. The method of claim 1, wherein the second storage level comprises an offline memory device that communicates with a file system via a network.

17. The method of claim 16, wherein the offline memory device comprises storage medium selected from floppy disks, optical disks, and magnetic tape.

18. A data processing system, comprising:
- a central processing unit;
- a random access memory for storing data and programs for execution by the central processing unit;
- a first storage level comprising a nonvolatile storage device; and
- computer readable instructions stored in the random access memory for execution by the central processing unit to perform a program for managing the storage of a file that has been selected for migration from the first storage level within a file system to a second storage level, wherein the program causes operations to be performed, the operations comprising:
- providing an inode of a first file that includes at least one reference, where the at least one reference includes a physical disk address of a data block of the first file;
- providing an inode of a snapshot file of the first file, where the inode includes at least one reference that includes the physical disk address of the data block of the first file;
- copying the at least one data block of the first file from the first storage level to the second storage level;
- updating the at least one reference of the inode of the snapshot file with a logical value, where the logical value includes a value indicating that additional processing is required to obtain the physical disk address of the data block of the first file; and
- providing a managed region that controls access to the data block through the inode of the first file.

* * * * *